US010663731B2

(12) United States Patent
Son et al.

(10) Patent No.: US 10,663,731 B2
(45) Date of Patent: May 26, 2020

(54) FREEFORM PROJECTED DISPLAY

(71) Applicant: Google LLC, Mountain View, CA (US)

(72) Inventors: Hui Son, Mountain View, CA (US); Oscar A. Martinez, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/798,996

(22) Filed: Oct. 31, 2017

(65) Prior Publication Data

US 2018/0136468 A1 May 17, 2018

Related U.S. Application Data

(60) Provisional application No. 62/422,982, filed on Nov. 16, 2016.

(51) Int. Cl.
*G02B 27/01* (2006.01)
*G02B 5/02* (2006.01)
(Continued)

(52) U.S. Cl.
CPC ....... *G02B 27/0172* (2013.01); *G02B 5/0252* (2013.01); *G02B 5/0294* (2013.01);
(Continued)

(58) Field of Classification Search
CPC .......... G02B 27/01; G02B 5/02; G02B 26/10; G02B 27/28; G02B 27/42; G03B 21/00
See application file for complete search history.

(56) References Cited

U.S. PATENT DOCUMENTS 5,757,544 A   5/1998  Tabata et al.
5,966,244 A  10/1999  Mukai et al.
(Continued)

FOREIGN PATENT DOCUMENTS

JP   2007219058 A  *  8/2007
KR    100869573 B1  * 11/2008

OTHER PUBLICATIONS

Rishi Sanyal, DP Review <https://www.dpreview.com/articles/6229436014/sony-s-curved-sensors-may-allow-for-simpler-lenses-and-better-images>, Accessed Jan. 9, 2018, 7 pages.
(Continued)

*Primary Examiner* — Isiaka O Akanbi
*Assistant Examiner* — Danell L Owens (57) ABSTRACT

A freeform projection display includes an optical emitter configured to output one or more wavelengths of light and an optical diffuser optically coupled to receive and disperse the one or more wavelengths of light from the optical emitter, wherein the optical diffuser has at least one radius of curvature. The freeform projection display further includes a refractive lens optically coupled to receive the one or more wavelengths of light from the optical diffuser and to project the one or more wavelengths of light. The freeform projection display further may include a light modulator disposed between the optical emitter and the optical diffuser, wherein the light modulator oscillates to project the image on the optical diffuser. An illuminated area of the optical diffuser is dimensioned so that the image produced by the light modulator fills an aperture of the refractive lens.

22 Claims, 5 Drawing Sheets

(51) Int. Cl.
  *G02B 27/28* (2006.01)
  *G02B 27/42* (2006.01)
  *G02B 26/10* (2006.01)
  *G03B 21/00* (2006.01)

(52) U.S. Cl.
  CPC ....... *G02B 27/0103* (2013.01); *G02B 27/281* (2013.01); *G02B 27/4244* (2013.01); *G02B 26/101* (2013.01); *G02B 2027/011* (2013.01); *G02B 2027/014* (2013.01); *G02B 2027/0123* (2013.01); *G02B 2027/0174* (2013.01); *G03B 21/006* (2013.01)

(56) References Cited

U.S. PATENT DOCUMENTS

| | | | |
|---|---|---|---|
| 6,157,352 | A | 5/2000 | Kollin et al. |
| 6,712,471 | B1 * | 3/2004 | Travis ............... G02B 3/00 345/8 |
| 2002/0196554 | A1 | 12/2002 | Cobb et al. |
| 2004/0008412 | A1 * | 1/2004 | Jiang ............ G02B 27/0101 359/487.02 |
| 2005/0041275 | A1 | 2/2005 | Kobayashi |
| 2005/0068255 | A1 * | 3/2005 | Urakawa ............ G02B 7/003 345/7 |
| 2007/0273983 | A1 * | 11/2007 | Hebert ............... G02B 5/1895 359/708 |
| 2009/0051879 | A1 * | 2/2009 | Vitale ............... G03B 21/28 353/28 |
| 2012/0013855 | A1 * | 1/2012 | Lescure ............ G02B 26/101 353/81 |
| 2014/0376095 | A1 * | 12/2014 | Koyama ............ G02B 5/0221 359/599 |
| 2017/0003448 | A1 | 1/2017 | Marshall |
| 2017/0045746 | A1 * | 2/2017 | Ellsworth ............ G02B 5/30 |
| 2017/0255015 | A1 * | 9/2017 | Geng ............... G02B 6/0008 |

OTHER PUBLICATIONS

LG Display, <http://www.lgdisplay.com/eng/product/technology/flexibleDisplay>, Accessed Jan. 9, 2018, 2 pages.
International Search Report and Written Opinion dated Jan. 24, 2018 for PCT Application No. PCT/US2017/059294, 15 pages.
Written Opinion of the International Preliminary Examining Authority dated Oct. 17, 2018 for corresponding International Application No. PCT/US2017/059294, 6 pages.
International Preliminary Report on Patentability dated May 31, 2019 for corresponding International Application No. PCT/US2017/059294, 9 pages.

* cited by examiner

FREEFORM PROJECTED DISPLAY

CROSS-REFERENCE TO RELATED APPLICATIONS

The present application claims priority to U.S. Provisional Patent Application No. 62/422,982, entitled "Freeform Projected Display" and filed on 16 Nov. 2016, the entirety of which is incorporated by reference herein.

BACKGROUND

In some head mounted display (HMD devices), an optical collimator is used to project the image of an object at infinity for virtual reality or augmented reality applications. The object being imaged is typically some type of flat display, such as a liquid crystal display (LCD) or organic light emitting diode (OLED) display. Conventional collimator optics are constrained by this requirement of a flat display panel. Correcting the aberrations induced by this requirement can significantly increase the number of optical surfaces and complexity based on other requirements such as field of view (FOV) and resolution.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

This disclosure provides systems and methods to reduce design constraints of an optical combiner that otherwise would require a flat display panel. In particular, the apparatuses and techniques described herein provide the ability to shape a display panel to any arbitrary form which allows for appreciable simplification of a projector system. As will be shown, this may be particularly useful for augmented reality (AR) and virtual reality (VR) headsets where space for optical systems is limited.

Figure 1:
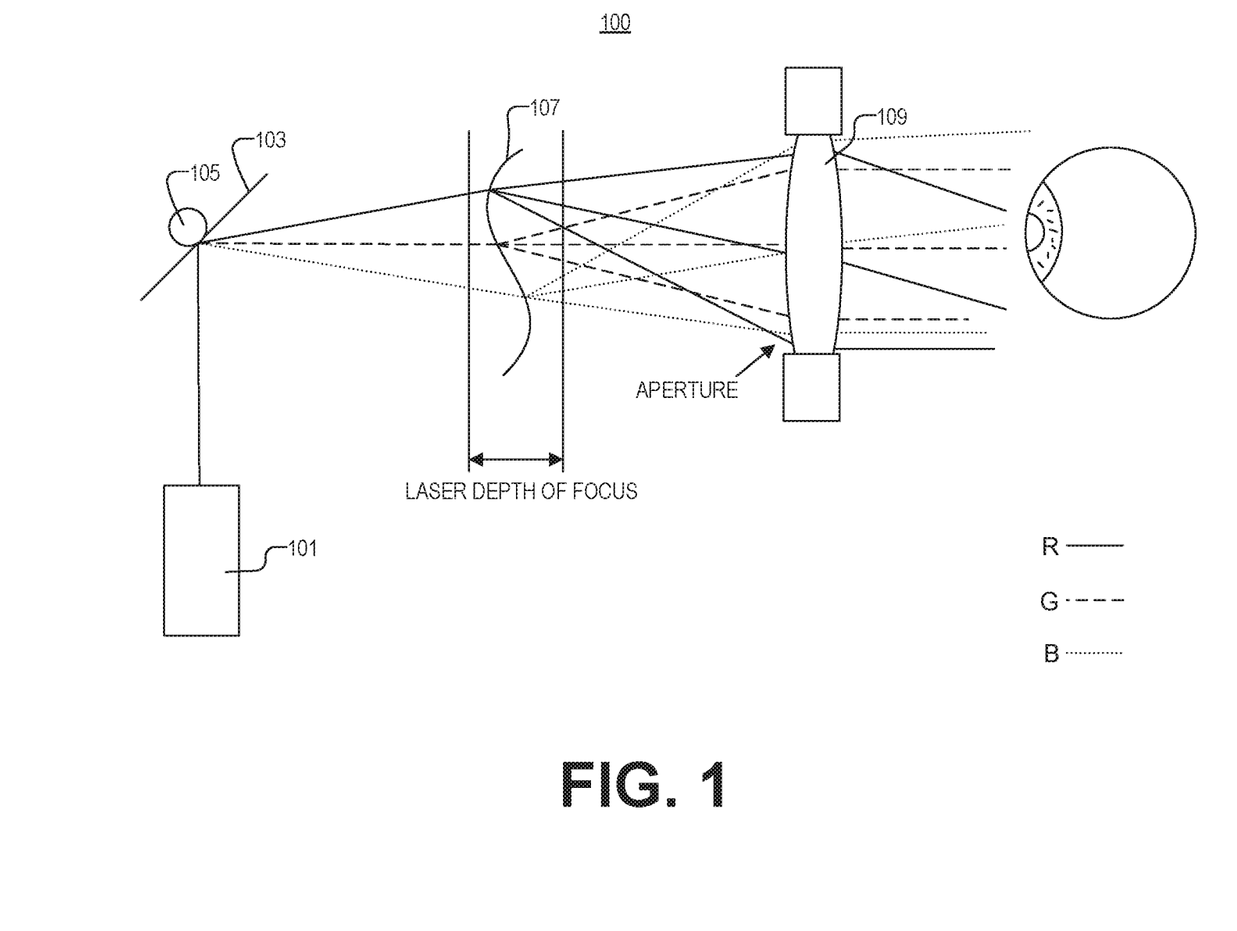
FIG. 1 is an illustration of a freeform back-projected display in accordance with some embodiments.

FIG. 1 is an illustration of a freeform back-projected display 100, in accordance with an embodiment of the disclosure. Display 100 includes optical emitter 101, scanning mirror 103 (one example of a light modulator), optical diffuser 107, and refractive lens 109. Optical emitter 101 (e.g., a monochromatic or polychromatic laser with one or more emission sources, multiple lasers, or the like) is configured to selectively output one or more wavelengths of light (e.g., red, green, and blue light). Optical diffuser 107 is optically coupled to receive (either directly from optical emitter 101, or indirectly from scanning mirror 103) and disperse the one or more wavelengths of light from optical emitter 101. As depicted, optical diffuser 107 has at least one radius of curvature. Refractive lens 109 is optically coupled to receive the one or more diffuse wavelengths of light from optical diffuser 107 and project the one or more wavelengths of light into the eye of a user. In the depicted embodiment the optical diffuser 107 is dimensioned as such, and the scattering angle of optical diffuser 107 is sufficiently large enough, for an image produced by the one or more wavelengths of light to fill the aperture of refractive lens 109. In the depicted embodiment, refractive lens 109 is a collimating lens, but in other embodiments refractive lens 109 may comprise another type of refractive lens.

In the depicted embodiment, scanning mirror 103 is disposed between optical emitter 101 and optical diffuser 107, and scanning mirror 103 oscillates to project an image on optical diffuser 107 using actuator 105. However, in other embodiments optical emitter 101 may directly shine light onto optical diffuser 107 by rapidly moving optical emitter 101 itself. In other embodiments, additional components may be disposed along the optical path between optical emitter 101 and optical diffuser 107 in order to enhance the image that the user sees. For example, additional lenses may be disposed between optical emitter 101 and scanning mirror 103 to shape the light output from optical emitter 101 before it reaches scanning mirror 103. In the depicted embodiment, optical diffuser 107 receives the one or more wavelengths of light from optical emitter 101 on a side of optical diffuser 107 opposite a user. In other words, optical diffuser 107 is a transmissive diffuser and backside illuminated.

Constraints on the optical design of refractive lens 109 can be significantly relaxed if the display is allowed to take on an arbitrary shape (e.g., the curving surface of optical diffuser 107). Optical emitter 101 (e.g., a scanning laser projector) is focused such that the depth of focus is large enough to accommodate the sag of the freeform shaped optical diffuser 107. In other words, the illuminated portion of optical diffuser 107 is within the depth of focus of optical emitter 101. Optical emitter 101 projects an image onto the freeform optical diffuser 107 which acts as the display for refractive lens 109. With this system, the optical diffuser 107 operates effectively as the "display screen" relative to refractive lens 109. As such, as the optical diffuser 107 may be freeform, so may the "screen shape" be truly freeform (unlike LED or other solid state-displays). For example, optical diffuser 107 may have two or more radii of curvature relative to any given axis or plane, and may take any arbitrary shape such as a cylinder or the like. In some embodiments, the two or more curves on the surface of optical diffuser 107 may intersect or be orthogonal to one another. Additionally, curves may take other shapes so that optical diffuser 107 has, for example, spherical or toroidal curvature.

Figure 2:
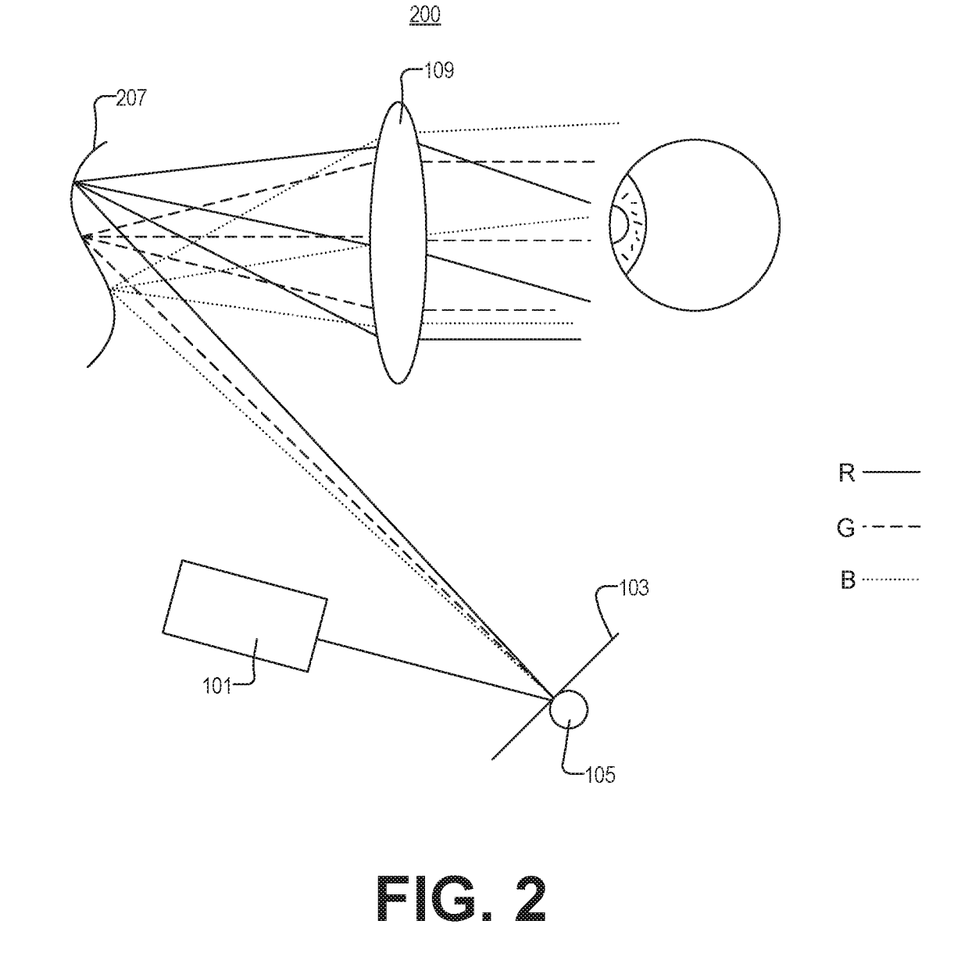
FIG. 2 is an illustration of a freeform front-projected display in accordance with some embodiments.

FIG. 2 is an illustration of a freeform front-projected display 200, in accordance with an embodiment of the disclosure. The display 200 of FIG. 2 is similar in many respects to the display 100 of FIG. 1; however, in FIG. 2 optical diffuser 207 receives the one or more wavelengths of light from optical emitter 101 on the same side of optical diffuser 207 as the user. In other words, optical diffuser 207 is a reflective optical diffuser and is frontside illuminated. Depending on the space constraints imposed on the display it may be beneficial to either use a transmissive optical diffuser or a reflective optical diffuser. Although the depicted embodiment shows that optical diffuser 207 receives the image light from scanning mirror 103, in other embodiments optical diffuser 207 may receive the image light directly from optical emitter 101.

Figure 3:
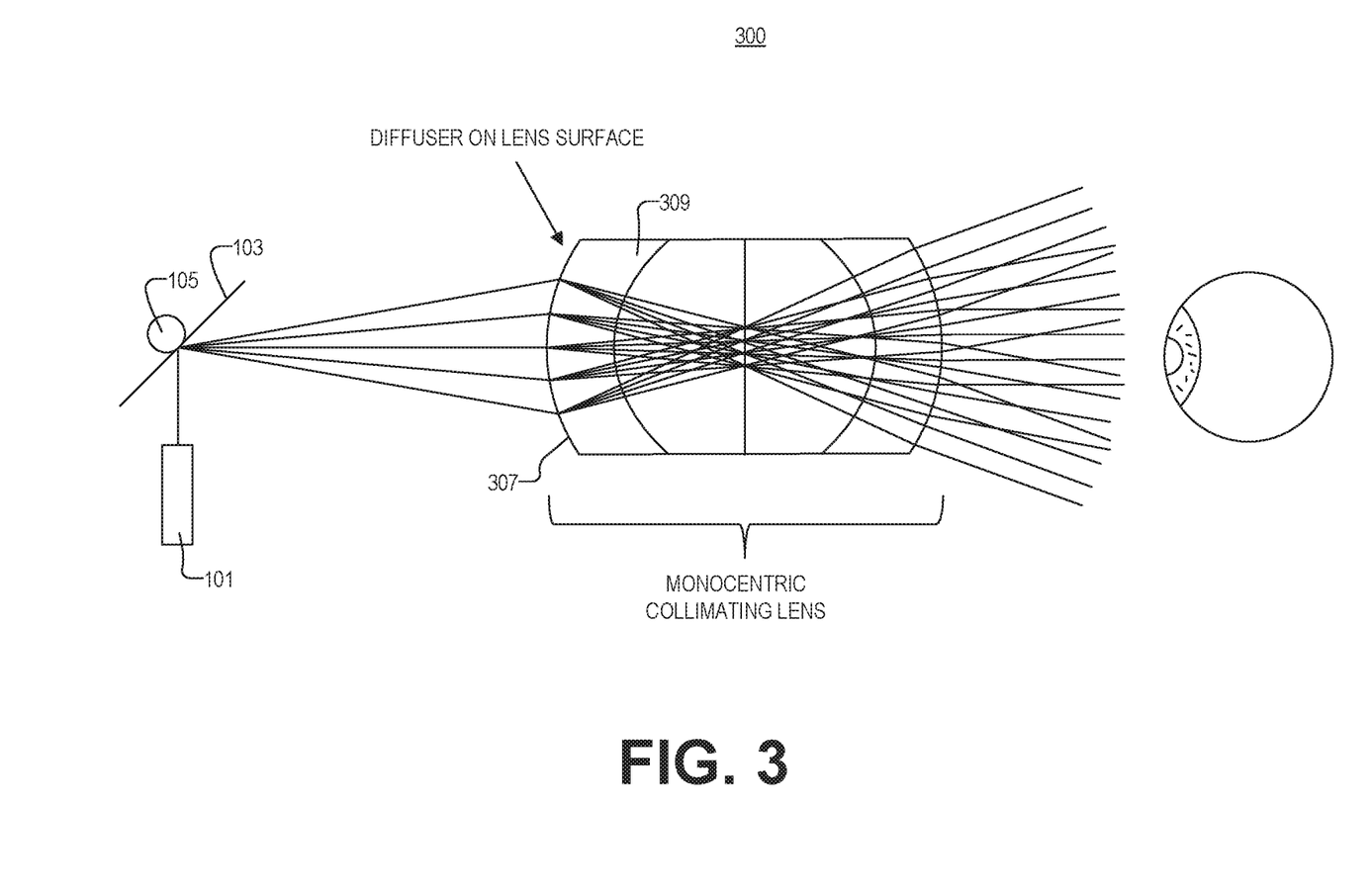
FIG. 3 is an illustration of a freeform back-projected display with an optical diffuser disposed on a refractive lens in accordance with some embodiments.

FIG. 3 is an illustration of a freeform back-projected display 300 with optical diffuser 307 disposed on refractive lens 309, in accordance with an embodiment of the disclosure. The display 300 of FIG. 3 is similar in many respects to the display 100 of FIG. 1; however, in FIG. 3 optical diffuser 307 is integrated into and/or onto the first surface of the lens of refractive lens 309. As depicted, refractive lens 309 is a monocentric collimating lens, which is spherical. However, in other embodiments the collimating lens need not be spherical, and can take other configurations. For instance, the monocentric lens may not be symmetric about the aperture stop. One skilled in the art will appreciate that optical diffuser 307 may be integrated on a surface or internally into various lens systems provided the image produced by optical emitter 101 is able to be clearly viewed by the user, in accordance with the teachings of the present disclosure.

Figure 4:
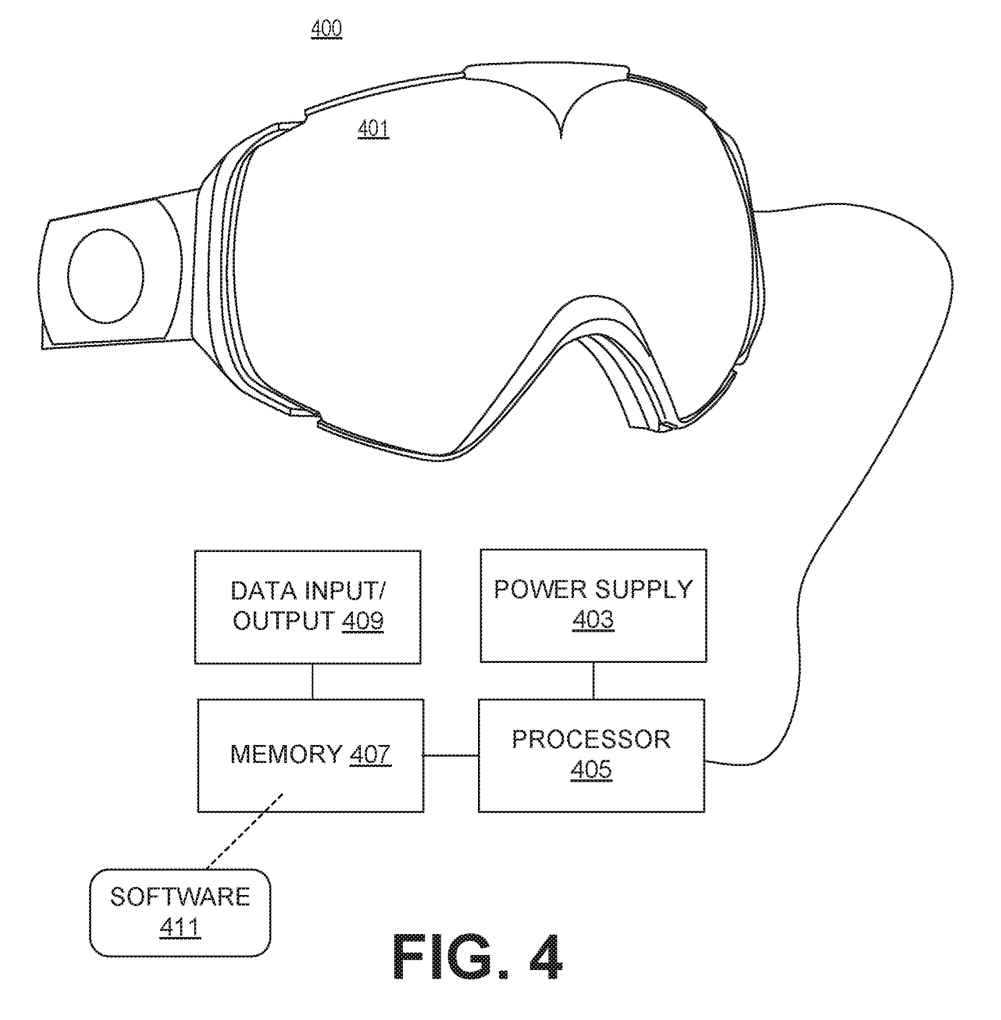
FIG. 4 is an example head-mounted display device including a freeform display in accordance with some embodiments.

FIG. 4 is an example head-mounted display device 400 including a freeform projection display (e.g., FIGS. 1-3), in accordance with an embodiment of the disclosure. Head-mounted display 400 is electrically coupled to power supply 403, processor 405, memory 407, and data input/output 409. All of these components may be internal or external to head mounted display 400.

As stated, contained within head-mounted display 400 is a projection system (e.g., from FIGS. 1-3) to project an image into an eye of a user, where the image may comprise, for example, a VR image or AR image from a sequence of VR/AR images. The projection system includes an optical emitter (e.g., optical emitter 101) configured to selectively output one or more wavelengths of light. Also included is an optical diffuser (e.g., optical diffuser 107, 207, 307) optically coupled to receive and disperse the one or more wavelengths of light. A refractive lens (e.g., refractive lens 109, 309) is optically coupled to receive the one or more wavelengths of light from the optical diffuser and focus the one or more wavelengths of light into the eye of the user wearing head mounted display 400. In some embodiments there may be one or more projection systems for each eye of the user.

Frame assembly 401 holds the projection system in place so that it can focus light into the eye of the user. As shown, frame assembly 401 is configured to attach to a head of the user (in the depicted embodiment this occurs with an elastic or adjustable strap that wraps around the head of the user). In other embodiments, attachment to the user's head may be accomplished with glasses-like struts that attach behind the ears of the user, or attachment may be achieved through any other attachment method. The projector system may be mounted in a variety of ways inside frame assembly 401. For instance, the collimating lenses may be placed directly in front of the user's eyes to completely immerse the user in the images being projected. Alternatively, the front of head-mounted display 400 may be transparent and the refractive lens may not be entirely disposed in front of the user, allowing the user to interact with the outside world and also see generated images.

The projection system in head-mounted display 400 is coupled to processor 405 to receive both the power and data needed to produce complex images. For example, the optical emitter and the scanning mirror may be electrically coupled to, and controlled by, processor 405 in accordance with software 411 stored in memory 407 and executed by processor 405. Moreover, the optical emitter and the scanning mirror may also receive power from power supply 403. In the depicted embodiment, data input/output 409 may be a port or a wireless transmitter/receiver to contact the internet (or any other data transmission technology). Memory 407 may one or more of RAM, ROM, flash, SDD, or the like. Head-mounted display 400 may couple by wire or wirelessly to a media input such as a computer or gaming system.

In one embodiment, multiple projector systems, or multiple parts of a single projector system, are tiled in an array to produce a larger eyebox area in head-mounted display 400. For instance, there may be multiple tiled refractive lenses, multiple tiled diffuser screens, or multiple tiled optical emitters in head-mounted display 400. One skilled in the art will appreciate that any number of the individual parts of in the projector system may be repeated to enhance performance of the head-mounted display 400, in accordance with the present disclosure.

Figure 5:
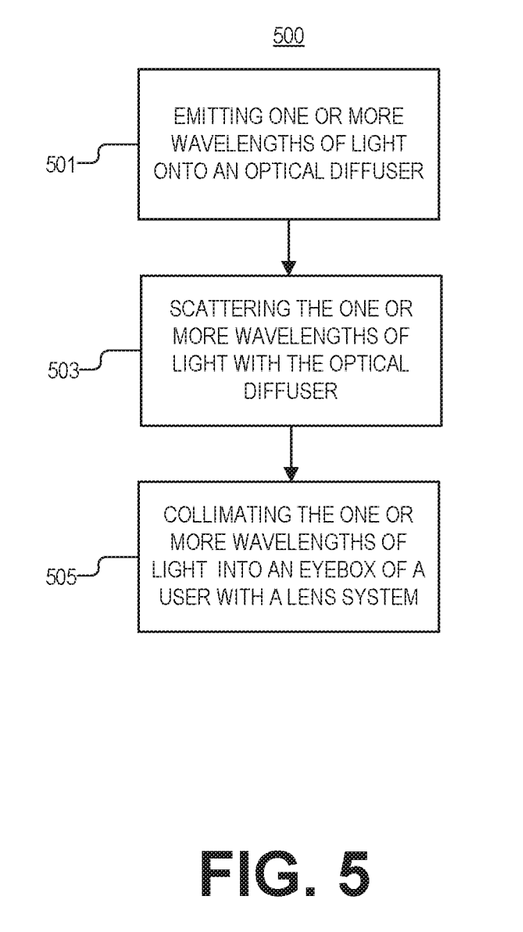
FIG. 5 is an illustration of a method of freeform projection in accordance with some embodiments.

FIG. 5 is an illustration of a method 500 of freeform projection, in accordance with an embodiment of the disclosure. The order in which some or all of process blocks 501-505 appear in method 500 should not be deemed limiting. Rather, one of ordinary skill in the art having the benefit of the present disclosure will understand that some of method 500 may be executed in a variety of orders not illustrated, or even in parallel. Additionally, method 500 may include additional blocks or have fewer blocks than shown, in accordance with the teachings of the present disclosure.

Block 501 illustrates emitting one or more wavelengths of light from an optical emitter onto a light incident surface of an optical diffuser. In several embodiments the optical emitter may be a laser or other coherent light source. However, in other embodiments the light from light source need not be coherent. In one embodiment, optical emitter may be a digital light processing (DLP) display device, diode, or the like.

Block 503 depicts scattering the one or more wavelengths of light with the optical diffuser. In one embodiment, the light incident surface of the optical diffuser has a plurality of radii of curvatures allowing for a totally freeform display. The optical diffuser may be a transmissive or reflective optical diffuser. The diffuser may be diffractive or refractive and may include microlenses. The diffuser may be a ground glass diffuser, a Teflon diffuser, a holographic diffuser, an opal glass diffuser, a greyed glass diffuser, or the like. Moreover, the diffuser may absorb a shorter wavelength of light from the optical emitter and re-emit a longer wavelength of light (e.g., absorption of UV light by the optical diffuser 107 and emission of visible light).

In one or more embodiments, a scanning mirror may be optically disposed between the optical emitter and the optical diffuser to control where the light emitted from the optical emitter hits the optical diffuser. For example, the scanning mirror may pivot on an actuator to direct the beam of light from the optical emitter. The steering of the beam can be one-dimensional or two-dimensional. Rotating the scanning mirror may result in periodic motion or freely addressable motion of the light beam. In other embodiments, light from the optical emitter may be modulated by acousto-optic modulators, liquid crystal gratings, electro-wetted prism cells, or the like.

To control the scanning motion, the scanning mirror may include a control electronics that provide suitable electric current to the motor and may also include an encoder. A software system may control the scanning mirror and also collect data about the image being output (to adjust/correct the output image). In order to move the light beam in two dimensions, the scanning mirror may either rotate one mirror along two axes, or reflect the laser beam onto two mirrors that are mounted on different axis. The scanning mirror may be moved/rotated by electric motor, galvanometer, piezoelectric actuators, or magnetostrictive actuators.

Block 505 shows collimating the one or more wavelengths of light scattered by the optical diffuser into an eyebox of a user with a lens system, so that an illuminated area of the optical diffuser is large enough for the image produced to fill an aperture of the lens system. Thus, when the user looks through the lens, the user's field of view is occupied by the image being projected.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A freeform projection display, comprising:
    an optical emitter configured to output one or more wavelengths of light;
    an optical diffuser optically coupled to receive and disperse the one or more wavelengths of light from the optical emitter, wherein a surface of the optical diffuser has at least two radii of curvature, wherein a first radius of curvature of the at least two radii of curvature is positive and a second radius of curvature of the at least two radii of curvature is negative, and wherein an illuminated portion of the optical diffuser receives the one or more wavelengths of light within a depth of focus of the optical emitter; and
    a refractive lens optically coupled to receive the one or more wavelengths of light from the optical diffuser and to project the one or more wavelengths of light.

2. The freeform projection display of claim 1, further comprising:
    a light modulator disposed between the optical emitter and the optical diffuser, wherein the light modulator oscillates to project an image on the optical diffuser.

3. The freeform projection display of claim 2, wherein an illuminated area of the optical diffuser is dimensioned so that the image produced by the light modulator fills an aperture of the refractive lens.

4. The freeform projection display of claim 1, wherein the optical diffuser receives the one or more wavelengths of light from the optical emitter on a side of the optical diffuser opposite a user.

5. The freeform projection display of claim 4, wherein the optical diffuser is disposed on a surface of the refractive lens.

6. The freeform projection display of claim 1, wherein the optical diffuser receives the one or more wavelengths of light from the optical emitter on a same side of the optical diffuser as a user.

7. The freeform projection display of claim 1, wherein the refractive lens is a monocentric collimating lens.

8. The freeform projection display of claim 1, wherein the optical diffuser comprises at least one of: a ground glass diffuser, a Teflon diffuser, a holographic diffuser, an opal glass diffuser, and a greyed glass diffuser.

9. A head mounted display implementing the freeform projection display of claim 1.

10. The freeform projection display of claim 1, wherein the at least two radii of curvature orthogonally intersect each other relative to a first axis.

11. The freeform projection display of claim 1, wherein the first radius and the second radius of curvature of the two or more radii of curvature intersect each other relative to a first axis.

12. A method of freeform projection, comprising:
    emitting one or more wavelengths of light from an optical emitter onto a light incident surface of an optical diffuser, wherein the light incident surface of the optical diffuser has at least one radius of curvature, and wherein the light incident surface of the optical diffuser receives the one or more wavelengths of light within a depth of focus of the optical emitter;

scattering the one or more wavelengths of light with the optical diffuser; and collimating the one or more wavelengths of light scattered by the optical diffuser into an eyebox of a user with a lens system, wherein the optical diffuser has two or more radii of curvature in the light incident surface of the optical diffuser that orthogonally intersect each other relative to a first axis, wherein a first radius of curvature of the two or more radii of curvature is positive and a second radius of curvature of the two or more radii of curvature is negative.

13. The method of claim 12, further comprising:
oscillating a light modulator disposed between the optical emitter and the optical diffuser so as to project an image on the optical diffuser.

14. The method of claim 13, wherein an illuminated area of the optical diffuser is dimensioned so that the image produced by the light modulator fills an aperture of a refractive lens of the lens system.

15. The method of claim 12, wherein the light incident surface is on a side of the optical diffuser opposite a user.

16. The method of claim 12, wherein the optical diffuser is disposed on a surface of a refractive lens of the lens system.

17. The method of claim 16, wherein the refractive lens is a monocentric collimating lens.

18. The method of claim 12, wherein the light incident surface is on a same side of the optical diffuser as a user.

19. The method of claim 12, wherein emitting one or more wavelengths of light from the optical emitter comprises emitting one or more wavelengths of light representative of a virtual reality image or augmented reality image from the optical emitter.

20. The method of claim 12, further comprising:
absorbing UV light by the optical diffuser; and
emitting visible light by the optical diffuser.

21. A head mounted display, comprising:
a projection system to project an image into an eye of a user, including:
an optical emitter configured to output one or more wavelengths of light;
an optical diffuser optically coupled to receive and disperse the one or more wavelengths of light, wherein the optical diffuser has at least two radii of curvature in a light incident surface of the optical diffuser, wherein a first radius of curvature of the at least two radii of curvature is positive and a second radius of curvature of the at least two radii of curvature is negative, and wherein the light incident surface of the optical diffuser receives the one or more wavelengths of light within a depth of focus of the optical emitter, and
a refractive lens optically coupled to receive the one or more wavelengths of light from the optical diffuser and project the one or more wavelengths of light into the eye of the user; and
a frame assembly to support the projection system on a head of the user with the refractive lens aligned to the eye.

22. The head mounted display of claim 21, wherein:
the refractive lens is partially disposed in a field of view of a user;
the optical diffuser is freeform shaped over its light incident surface; and
the projection system further includes a scanning mirror optically disposed between the optical emitter and the optical diffuser to control where the light emitted from the optical emitter hits the optical diffuser by moving the one or more wavelengths of light in two dimensions.

* * * * *